United States Patent [19]

Murata et al.

[11] Patent Number: 4,645,440
[45] Date of Patent: Feb. 24, 1987

[54] ROTOR FOR ROTARY PISTON ENGINES

[75] Inventors: Yoshinori Murata, Hiroshima; Yoshio Tanita, Nagoya, both of Japan

[73] Assignee: Mazda Motor Corporation, Hiroshima, Japan

[21] Appl. No.: 748,585

[22] Filed: Jun. 25, 1985

[30] Foreign Application Priority Data

Jun. 29, 1984 [JP] Japan .............................. 59-98060[U]

[51] Int. Cl.$^4$ ............................................ F01C 21/00
[52] U.S. Cl. .................................... 418/178; 525/189; 428/419; 428/422
[58] Field of Search ............................... 418/178, 179; 417/DIG. 1; 123/242; 525/189; 428/422, 419, 421

[56]           References Cited
          U.S. PATENT DOCUMENTS

| 3,981,945 | 9/1976 | Attwood | 525/189 |
| 4,041,002 | 8/1977 | Aboshi | 525/189 |
| 4,209,286 | 6/1980 | Schwartz | 418/178 |
| 4,225,295 | 9/1980 | Shimizu | 418/178 |

FOREIGN PATENT DOCUMENTS 49-47207 12/1974 Japan .

Primary Examiner—Carlton R. Croyle
Assistant Examiner—Jane E. Obee
Attorney, Agent, or Firm—Fleit, Jacobson, Cohn & Price

[57]                ABSTRACT

A rotor for rotary piston engines having flanks coated with coatings of a modified fluorine resin. The modified fluorine resin is prepared with a fluorine resin, such as tetrafluoroethylene resin, and a binder resin, such as epoxy resin. The coating layer is formed by applying the modified resin to the flank surface of the rotor and drying it at a low temperature to have the resin adhered to the flanks. The coating is heat-resistant and has an anti-peel-off property. The coating is softened during engine operation so that it can catch deposits of unburnt residual substances. The rotor is therefore effective to prevent carbon lock.

2 Claims, 4 Drawing Figures

F I G. 3
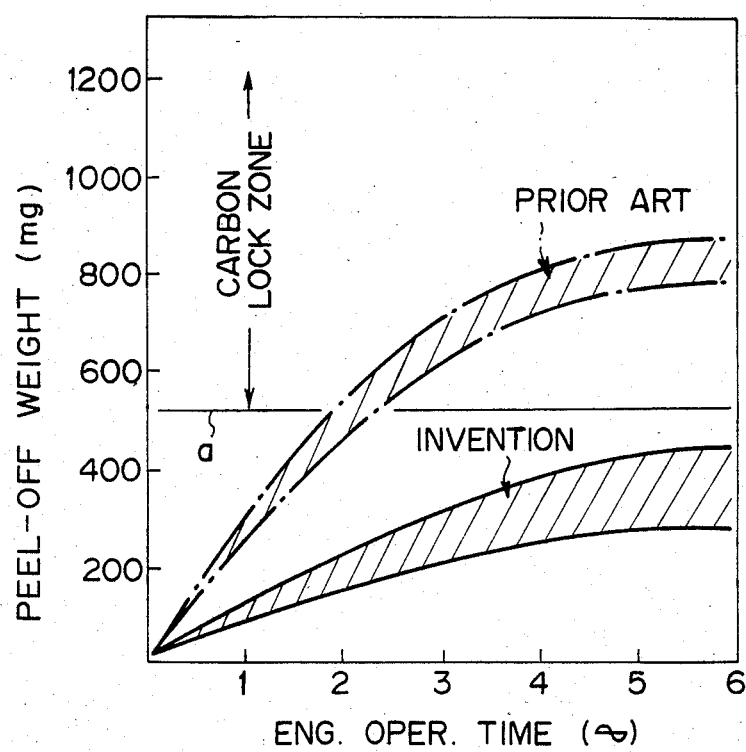

ROTOR FOR ROTARY PISTON ENGINES

BACKGROUND OF THE INVENTION

1. Field of the Invention

The present invention relates to rotary piston engines, and more particularly, to rotors for rotary piston engines. More specifically, the present invention pertains to rotors having plastic coatings on their flank surfaces.

2. Description of the Prior Art

In the field of rotary piston engines, it has already been proposed to provide plastic coating on flanks of rotors. For example, Japanese patent publication 49-47207 published for opposition on Dec. 14, 1974 teaches to form a soft plastic coating at least on the leading part of each rotor flank. The purpose of such plastic coating is to decrease the gap between the inner wall of the rotor housing and the rotor flank to thereby decrease the amount of combustion gas carried over from the exhaust working chamber to the intake chamber. The Japanese patent publication suggests to use polyamide resin, phenolic resin, tetrafluoroethylene or silicon rubber, which is applied to the rotor flank and then dried under an elevated temperature. The proposed structure is considered as being effective to suppress engine knocking due to self ignition of the combustion mixture since the amount of the residual combustion gas can be decreased.

It should, however, be noted that the proposed structure has a danger of carbon lock, which is a phenomen wherein the rotor is clogged by carbon-containing particles which are caught in the gap between the rotor and the rotor housing. Usually, in operation of rotary piston engines, fuel and a small quantity of lubricant oil are burnt in the working chambers and produce unburnt residual substances. Such residual substances include organic ones such as tar and other carbon-containing substances, and inorganic ones such as sulphuric acid, sulphur, lead and other substances. These residual substances deposit on the rotor flanks and are forced under the pressure of the combustion gas in the working chamber to the rotor flanks to form deposit layers, which are similar to the coatings formed through spray coating processes. In the deposits of such residual substances the inorganic components have a tendency to absorb moisture in air and to swell to weaken the adhesive properties of the deposited layer. If such moisture absorption is repeated, the deposited layer is broken and broken pieces are allowed to fall off.

In conventional rotary piston engines, the rotor surfaces are usually galvanized and the deposits of the residual substances are adhered to the galvanized layer through hydrogen bonds. It should further be pointed out that an acidic atmosphere is therefore formed at the interface between the deposited layer and the galvanized layer and the acidic atmosphere is effective to maintain the hydrogen bond. However, moisture that penetrates to the interface promotes oxidation of zinc producing hydroxides, which are of an alkaline nature. Such hydroxides function to neutralize the acidic atmosphere and form zinc soap layers which have very low adhesive power. Thus, the aforementioned carbon lock is very likely to occur in rotary piston engines having galvanized rotors.

In the aforementioned Japanese patent publication, the rotor flanks are coated by resin which is simply applied thereto and dried under an elevated temperature. The resin coating has little adhesive property so that deposits of the unburnt residual substances are very easily removed from the rotor flanks possibly causing the carbon lock. In fact, depending on the lubricating oil and/or the fuel, such carbon lock phenomenon occurs at a very early stage of the engine life.

SUMMARY OF THE INVENTION

It is therefore an object of the present invention to provide a rotor for rotary piston engines which can prevent the aforementioned carbon lock.

It is another object of the present invention to provide a rotor for rotary piston engines, the rotor formed on the flank surfaces with resin coatings which can retain deposits of unburnt residual substances against falling-off even under a high temperature.

It is a further object of the present invention to provide a rotor having flanks formed with resin coating of a strong adherent power to retain deposits of residual substances.

It is still further object of the present invention to provide resin coatings on the flank surfaces of a rotor which are highly resistant to heat and to degradation.

According to the present invention, there is provided a rotor having flanks coated with fluorine resin modified to possess a thermoplastic nature. The modified fluorine resin may be applied to the rotor flank with binder resin.

Preferably, modified telrafluoroethylene resin is used for the fluorine resin. The binder resin may consist of a polysulfone resin. As the binder, use may also be made of either of epoxy resin, phenolic resin, polyamide resin, urethane resin, acrylic resin, silicone resin, polyphenylene sulfide resin, and polyethersulfone resin. The modified fluorine resin is applied to the flank surfaces of the rotor. After drying, the resin is adhered to the flank surfaces to form coatings. The modified fluorine resin is preferably dried under a temperature not higher than 100° C. The modified fluorine resin has a viscosity between about $10^4$ poise and about $10^5$ poise when melted. It is preferable that the coating layer has a thickness between about 14 microns and about 60 microns. The modified fluorine resin is heat-resistant and has an adherent property under a high temperature so that the coatings of the resin catch the deposits of the residual substances preventing the deposits from falling off. Thus, it is possible to prevent carbon lock effectively for a long time. The coatings of the resin can be provided by simply applying it to the rotor flanks and drying without heating.

The above and other objects and the features of the present invention will become apparent from the following descriptions of prefered embodiments taking reference to the accompanying drawings.

BRIEF DESCRIPTION OF THE DRAWINGS

FIG. 3 is a diagram showing results of peel tests;

DESCRIPTION OF THE PREFERRED EMBODIMENT

Figure 1:
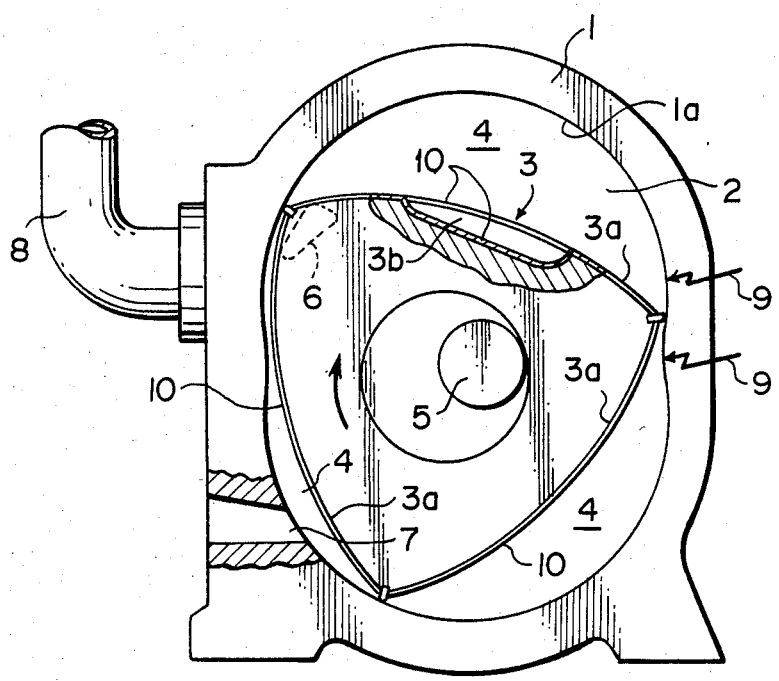
FIG. 1 is a sectional view of a rotary piston engine having a rotor in which the present invention is embodied.

Referring now to the drawings, particularly to FIG. 1, there is shown a rotary piston engine including a rotor housing 1 having a inner surface 1a of a trochoidal configuration and side housings 2 attached to the opposite sides of the rotor housing 1, to define a casing in which a polygonal rotor 3 is disposed for slidable rotation with its apex portions in contact with the inner surface 1a of the rotor housing 1 so that working chambers 4 are defined by the inner surface 1a of the rotor housing and respective flanks of the rotor 3. The rotor 3 is provided with recesses 3b in the center portion of the respective surfaces 3a thereof and is carried by an eccentric shaft 5 to rotate in the direction shown by an arrow in FIG. 1. The casing is formed with an intake port 6 connected to an intake passage 8 and an exhaust port 7, as in a conventional rotary piston engine. There are disposed ignition plugs 9 in the combustion side of the rotor housing 1. Although not shown in FIG. 1, there is provided in the intake passage means for supplying fuel to the engine. Further, lubricating oil is supplied to the intake passage 8 and to an intake working chamber 4.

A modified fluorine resin modified to possess a thermoplastic property is applied to each flank surface 3a of the rotor 3 to form a coating layer 10 on the flank surface 3a.

An exemplary composition of the aforementioned modified fluorine resin is the one shown by the following table.

|  | Content (wt %) | Standard (wt %) |
| --- | --- | --- |
| tetrafluoroethylene resin | 3~8 | (5) |
| binder resin | 12~18 | (10) |
| pigment | 0 | (0) |
| organic solvent (methylisobutylketone) | 77~83 | (80) |

Figure 2:
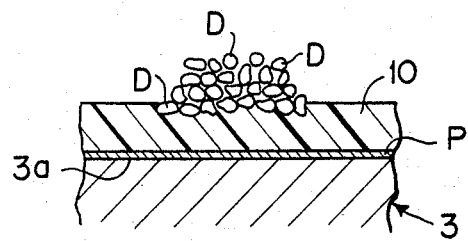
FIG. 2 is a fragmentary sectional view showing a coating layer in accordance with the present invention.

It is recommendable that tetrafluoroethylene be contained between 3 to 8 wt %. With a content of tetrafluoroethylene less than 3%, the coating will have undesirably low viscosity under a high temperature. On the other hand, when the content is more than 8%, the coating layer 10 will have undesirably low adherent power to the flank surface 3a. When the content of the binder resin is less than 12%, the coating layer 10 will have undesirably low adherent power to the flank surface 3a. On the other hand, with a content more than 18%, the coating layer 10 will have undesirably low viscosity. A pigment is not added to the composition of the modified resin because the pigment will decrease the viscosity of the coating layer 10. The modified fluorine resin may be applied, for example, by a brush, a spray, or the like, to the flank surface 3a of the rotor 3, wherein the flank surface 3a is formed with a galvanized layer P thereon. The modified fluorine resin, is then dried by allowing the organic solvent to vaporize at a temperature not higher than 100° C., for example at 80° C., to form the aforementioned coating layer 10 which is adhered to the flank surface 3a as shown in FIG. 2. The coating layer 10 has a high resistance to heat and is softened at a high temperature so that the coating layer 10 can firmly catch unburnt residual substances deposited on the surface thereof preventing them from falling off. There is shown in FIG. 3 test results in which the rotor 3 with the coating layer 10 in accordance with the present invention is compared with a conventional rotor in respect of the adherent power of the deposits. The tests have been carried out by operating the engines having the respective rotors in low temperature, mini-thermal test modes wherein one test mode cycle comprises the steps of operating the engines at an engine speed of 3500 r.p.m for 30 minutes, increasing the engine speed rapidly from 3500 r.p.m to 7000 r.p.m in 10 seconds, operating the engines at the engine speed of 7000 r.p.m for 35 minutes, and taking 17 minutes to decrease the engine speed gradually from 7000 r.p.m to 3500 r.p.m and, repeating this test mode cycle 6000 times. In the test mode, the temperature of the lubricant is maintained at about 67.5° C.

Then, the deposits on the rotor flanks have been subjected to peel-off tests under a high humidity atmosphere. In FIG. 3, the peeled-off weight of the deposits greater than the horizontal line a has a danger of carbon lock being produced. Therefore, the area in FIG. 3 above the line a may be referred to as the "carbon lock zone". It will be noted that, in the rotor 3 with the coating layer 10, the peel-off weight of the deposit is lower than the line a as shown by solid lines and smaller than one-half of the peeled-off weight in the conventional rotor, which is shown by chain lines. According to experience, where the peel-off weight of the deposit is lower than the line a, the peeled-off particles of the residual substances can be exhausted with the exhaust gas. It will therefore be understood that the present invention can prevent carbon lock effectively.

It will thus be understood that although the deposits of the unburnt residual substances are subjected to repeated swelling and drying in use of the engine, the deposits are firmly caught by the adherent power of the coating 10 so that possiblity of the deposits being peeled off can substantially be decreased. It should further be noted that the coating 10 provided in accordance with the present invention functions to isolate the zinc plating layer P from the deposits D. This will also increase the resistance of the deposits against peeling off.

In general, fluorine resin has a viscosity between $10^{14}$ poise and 10 poise under a molten state with a molecular weight between 3 million and 4 million. On the other hand, the aforementioned modified fluorine resins of thermoplastic, tetrafluoroethylene type have a low viscosity which is between $10^4$ and $10^5$ poise with a molecular weight between 1,000 and 10,000. The modified fluorine resins are prepared with quantities of additives as small as possible so that the resins possess a high resistance to heat. Refererring to FIG. 4, there is shown the influence of temperature on the hardness or the softening property of the coating layer under various thicknesses of the coating layer. The hardness tests have been conducted in accordance with Japan Industrial Standard JIS-K-6894.

Figure 4:
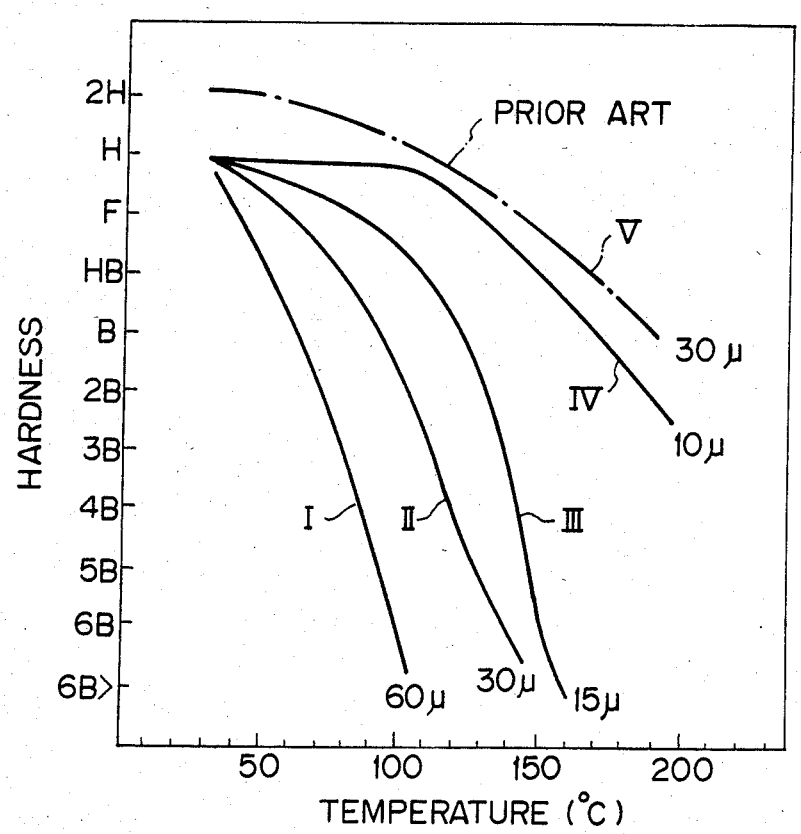
FIG. 4 is a diagram showing the change in hardness of the resin coating in accordance with changes in temperature under various thicknesses of the coatings.

It will be noted that the coating thickness can be between 15 to 60 microns. In FIG. 4, the dotted line V shows the hardness of the coating of an unmodified resin, whereas the solid lines I through IV show the hardness of the coatings of the modified resin. The test results show that even with the modified resin the hardness of the coating will not be decreased to a satisfactory level where the coating thickness is 10 microns. Where the thickness of the coating of the modified resin is between 15 and 60 microns, a sufficient decrease in the hardness is obtained under a high temperature. With the coating thickness greater than 60 microns, the coating possesses a satisfactorily low hardness, however, bubbles will be formed in the coating so that the coating will lose its adherent power.

The modified fluorine resin is prepared by adding fluorine resin such as tetrafluoroethylene to a resin binder solution. The binder resin may be selected from epoxy, phenol, polyamide, urethane, acryle, silicone, polyphenylensulfide, polyethersulfone, polysulfone. The modification of the fluorine resin is made for utilizing the heat-resistant property, the adherent power and hardness of the binder resin. The fluorine resin itself does not have a sufficient adherent power; however, due to the addition of the binder resin, the modified fluorine resin possesses a satisfactory adherent power. Therefore, it is unnecessary to use a primer in applying the modified fluorine resin to the rotor. Although fluorine resin in general has a high melting point, the modified resin can be applied under a low temperature, such as room temperaure.

While the present invention has been described with reference to specific examples, it is not confined to the details set forth, but it is intended to cover such modifications or changes that may come within the scope of the following claims:

We claim:

1. A substantially polygonal rotor for rotary piston engines, said rotor comprising a plurality of flanks, said flanks being coated with a modified fluorine resin including tetrafluoroethylene and a binder comprised of a polysulfone resin, the modified fluorine resin having a viscosity of from about $10^4$ poise to about $10^5$ poise in a molten state and a molecular weight of from about 1000 to about 10,000, said modified fluorine resin being applied to the rotor flanks and dried at a temperature not higher than 100° C. to form a coating adhered to the flanks, said coating having a low surface hardness and sufficient surface adhesion to receive and retain deposits of unburnt residual substances which are produced during operation of the engine to prevent carbon lock.

2. A rotor in accordance with claim 1 in which the coating layer has a thickness of 15 microns to 60 microns.

* * * * *